United States Patent [19]

Zinkan et al.

[11] Patent Number: 5,382,367
[45] Date of Patent: Jan. 17, 1995

[54] METHOD OF TREATING COOLING WATER SYSTEMS

[75] Inventors: K. James Zinkan, Chagrin Falls; Louis J. Koenig, Jr., Parma, both of Ohio

[73] Assignee: Zinkan Enterprises Co., Twinsburg, Ohio

[21] Appl. No.: 794,934

[22] Filed: Nov. 20, 1991

Related U.S. Application Data

[63] Continuation-in-part of Ser. No. 549,398, Jul. 5, 1990, abandoned, which is a continuation-in-part of Ser. No. 191,919, May 9, 1988, abandoned, which is a continuation-in-part of Ser. No. 82,838, Aug. 7, 1987, abandoned.

[51] Int. Cl.$^6$ .................................................. C02F 5/10
[52] U.S. Cl. .................................... 210/698; 252/180; 252/388; 252/394; 210/701; 210/759; 210/764
[58] Field of Search ............... 210/759, 698, 764, 701; 252/387, 388, 394, 396, 180, 181

[56] References Cited

U.S. PATENT DOCUMENTS

| | | | |
|---|---|---|---|
| 4,209,398 | 6/1980 | Ii et al. | 210/58 |
| 4,217,216 | 8/1980 | Lipinski | 210/58 |
| 4,282,715 | 8/1981 | Edwall et al. | 60/646 |
| 4,530,955 | 7/1985 | Wilson et al. | 252/181 |
| 4,709,091 | 11/1987 | Fukumoto et al. | 562/595 |
| 4,973,409 | 11/1990 | Cook | 210/701 |

Primary Examiner—Jacqueline V. Howard
Assistant Examiner—J. Silbermann

[57] ABSTRACT

A method of preventing and controlling corrosion and build-up of scale in cooling-water systems at water temperatures below about 212° F. The method comprises the use of an effective amount of hydrogen peroxide, i.e., 0.01 to 100 parts by weight per million parts of water, about 0.01 to 100 parts by weight of at least one organic triazole per million parts of water, 0.1 to 200 parts by weight per million parts of water of at least one polymerized ethylenically unsaturated carboxylic acid, e.g., polymerized maleic acid having average molecular weights ranging from about 250 to 500,000 and 0 to 200 parts by weight, e.g., 0.1 to 50 parts of at least one non-ionic surfactant.

7 Claims, No Drawings

METHOD OF TREATING COOLING WATER SYSTEMS

CONTINUATION APPLICATION

This application is a continuation-in-part of copending application Ser. No. 07/549,398 filed Jul. 5, 1990 now abandoned which is a continuation-in-part of application Ser. No. 07/191,919 filed May 9, 1988 now abandoned which in turn is a continuation-in-part of application Ser. No. 082,838 filed Aug. 7, 1987, now abandoned.

BACKGROUND OF THE INVENTION

This invention is directed to a method for inhibiting corrosion and the deposition of scale and sludge on heat-transfer surfaces of cooling water systems at cooling water temperatures below 212° F. The sludge formed from the hardness of water of salts etc. in cooling water is conditioned to prevent adherence to the internal metal surfaces of the cooling systems, and the particle size of the sludge is maintained sufficiently small, in accordance with this invention, to keep the sludge in suspension with at least one polymeric dispersants for removal by side-stream filtration. In water cooling systems and particularly in recirculating systems such as cooling towers and the like, there is a tendency for the insoluble salts, e.g., inorganic alkaline earth metal salts to deposit on the heat transfer surfaces. In accordance with this invention, these salts are conditioned by treating the cooling water with an effective amount of hydrogen peroxide, water soluble polymers derived from carboxylic acids such as polymers of maleic acid or acrylic acid, a non-ionic surfactant and at least one triazole corrosion inhibitor. It has been found, that in addition to inhibiting the insoluble salts from depositing on the cooling surfaces, the treatment of the water inhibits crystal growth and prevents adherence to the metal surfaces by conditioning the heat transfer surface's ability to absorb the crystals, and thereby impedes the buildup of scale and the like.

The formation of scale on heat transfer surfaces is a problem in heat-exchange or cooling-water equipment in power stations, industrial cooling systems, and the like. Scale and other inorganic metal deposits lower the efficiency of heat transfer, causing overheating and damage to the equipment. Deposits from cooling water comprises crystalline scale, metal oxides, carbonates, etc., which precipitate on the internal surfaces of the equipment. Scale is formed primarily by crystallization when the scale-forming constituents become super-saturated and deposit from solution onto the metal surface. Many factors influence scale formation, including solubility of the various materials such as calcium carbonate, calcium sulfate, and the like, and the tendency of these materials to become super-saturated as water evaporates from the systems. The formation of scale in water cooling, i.e. at temperatures below 212° F. can be controlled, however, by chemical treatment, not only to inhibit the formation of scale but also to remove and prevent the accumulation of scale on the cooling surfaces.

Moreover, because of the increase in cost of supplying makeup-water for the cooling system coupled with the rising expense for waste-water treatment, there have been attempts to reuse the waste water streams as the cooling water makeup. Reused water can include various water sources such as blowdowns, processed water, plant discharge water and the like. The reuse of the water requires the recycling of the cooling tower blow-down back to the cooling systems. One of the major incentives for reusing cooling-tower blowdown water is the high cost of removing the toxic additives such as chromates etc., from the water prior to discharge.

Presently, various scale inhibitors are being used to prevent precipitation and adhesion of the scale to the metal surfaces. These inhibitors include such compounds as the inorganic phosphorous compounds, e.g., the phosphoric acid salts, the organic phosphorous compounds, like the alkyl phosphates and alkyl phosphites and various organic polymers. To prevent corrosion, known inhibitors such as the chromates are being used, which are known to be dangerous to the environment and therefore present environmental problems. To overcome and avoid the use of toxic chemicals such as chromates, various polyphosphoric acids and the salts thereof, e.g., phosphonic acid and the phosphoric acid esters are being used as a replacement. In addition, various other materials including the lignins, starches, tannins, etc., have been used as conditioners for sludge without satisfaction.

A number of patents disclose the use, for example, of polymers of styrene-sulfonic acid with other polymerizable monomers such as maleic acid for water treatment, see U.S. Pat. No. 4,048,066. U.S. Pat. No. 3,671,448 also discloses the use of phosphonic acids for the treatment of scale, and the use of these acids in combination with other water treatment chemicals. Further, U.S. Pat. No. 3,297,578 discloses the use of diphosphonic acids for purposes of inhibiting incrustations while U.S. Pat. No. 3,289,734 discloses a scale-inhibiting process using copolymers of styrene and maleic anhydride. U.S. Pat. No. 4,217,216 discloses the use of phosphonic acid derivatives in combination with azoles and molybdates for inhibiting corrosion and scale. However, none of these prior art patents suggest the process of treating cooling water at temperatures below 212° F. as set forth in this invention.

SUMMARY OF THE INVENTION

This invention is directed to a method of using a unique combination of hydrogen peroxide with polymers of carboxylic acid or derivative thereof with average molecular weights ranging up to about 500,000 in combinations with at least one organic triazole. The invention comprises a method for preventing and controlling corrosion and scale in cooling water systems which consist essentially of adding to the water, at temperatures below 212° F., an effective amount of hydrogen peroxide to destroy and control any bacteria with about 0.01 to 100 parts by weight per million parts by weight of water of at least one organic triazole such as benzotriazole and about 0.1 to 200 parts by weight per million parts by weight of water of at least one polymerized ethylenically unsaturated carboxylic acid or derivatives thereof, e.g., polymers and copolymers of maleic acid and salts thereof having average molecular weights ranging from about 250 to 500,000 and effective amounts of a non-ionic polymeric surfactant.

Accordingly, it is an object of this invention to provide a method for conditioning scale and preventing corrosion in cooling water and subsequently removing any sludge by sidestream filtration.

Another object of this invention is to avoid the need for bleedoff from the cooling water systems by treating the water in the systems with a combination of hydrogen peroxide, polymers derived from carboxylic acids and an organic triazole.

It is another object of this invention to provide a method whereby zero discharge is obtained by using sidestream sludge removal and then reusing the treated water by recycling to the system.

A further object of this invention is to provide a method for inhibiting the deposition of scale and corrosion on cooling water surfaces and to reduce the tendency for the formation of crystalline sludge by treatment of the cooling water in the cooling systems at temperatures below about 212° F.

These and other objects of the invention will become apparent from a further and more detailed description as follows.

DETAILED DESCRIPTION OF THE INVENTION

The prevention of corrosion and build-up of scale generally found in cooling water systems can be controlled in accordance with this invention by adding effective amounts of hydrogen peroxide to the cooling water to control the bacteria in the water, i.e., from about 0.01 to 100 parts by weight and preferably from about 0.1 to 20 parts by weight of hydrogen peroxide per million parts by weight of water in the system. In addition to the peroxide, the cooling-water is treated with about 0.01 to 100, and preferably 0.1 to 50 parts by weight of at least one triazole, e.g., benzotriazole or tolyltriazole per million parts by weight of water, and about 0.1 to 200, and preferably from about 0.5 to 75 parts by weight, per million parts by weight of water, of at least one ethylenically unsaturated carboxyl-containing monomer such as a carboxylic acid, i.e., maleic, and derivatives thereof polymerized to average molecular weights ranging from about 250 to 500,000 and more likely molecular weights ranging from about 400 to 10,000. Preferably, combinations of an anionic maleic acid polymer and acrylic polymers, e.g., polyacrylamide can be used at any ratio, in amounts ranging from about 0.1 to 200 parts by weight per million parts of the cooling water, e.g., 0 to 200 parts by weight of polyacrylamide with 0.1 to 200 parts of the maleic acid polymer. The polyacrylamides are substantially water soluble having molecular weights ranging from 10,000 to one million. In addition, from 0 to 200 parts by weight of a non-ionic surfactant can be used in combination with the anionic dispersants.

The addition of the peroxide in combination with the triazoles and the anionic polymers to the cooling water at temperatures below 212° F. kills the bacteria and prevents the buildup of scale and corrosion. Generally, the treatment of cooling water required specific control of the pH to avoid adversely affecting the additives used to treat the water. In accordance with this invention, however, hydrogen peroxide is not adversely affected by the pH of the water, unless subjected to extreme acid or basic conditions or temperatures above about 212° F. The peroxide acts to eliminate or purge from the cooling water of any biofilm, e.g., bacteria which accumulates on the cooling surface of the equipment.

Cooling water systems as distinguished from boiler water have the problem of bacteria accumulation which causes scale build-up and consequently corrosion and insufficient cooling. At cooling water temperatures, e.g., below 212° F. the growth of bacteria is substantial in comparison to boiling water. It was found that at cooling water temperatures, i.e., below boiling the bacteria in the water can be controlled to substantially eliminate the build-up of scale and corrosion which would normally occur. The control or elimination of such scale and corrosion can be accomplished by the addition to the cooling water at temperatures below about 212° F. an effective amount of a combination of hydrogen peroxide, an organic triazole and a polymer derived from carboxylic acids or a derivative thereof, e.g., polymers and copolymers derived from maleic acid. The polymers are substantially water soluable and have average molecular weights ranging from about 250 to 500,000.

The following tests were conducted by using city water with the addition of calcium chloride, magnesium chloride and sodium bicarbonate.

| PPM | | Corrosion Rates MPY |
|---|---|---|
| | EXAMPLE I | |
| Blank (city water) | | 12.2 |
| | EXAMPLE II | |
| 0.7 | Hydrogen Peroxide | 16.5 |
| | EXAMPLE III | |
| 14.0 | Maleic Acid Polymer | |
| 3.0 | Sodium Tolyltriazole | |
| 0.7 | Hydrogen Peroxide | 11.5 |

The data in above Examples shows that where a bactericide is needed in cooling water, the addition of hydrogen peroxide alone causes the rate of corrosion to increase over a period of a year as shown by comparing the data in Examples I and II. However, by using the same amount of hydrogen peroxide in combination with a polymeric dispersant such as maleic acid polymers and at least one triazole, the rate of corrosion decreased as shown in Example III. Thus, the addition of hydrogen peroxide to the cooling water in combination with the triazole and the polymeric dispersant inhibits the rate of corrosion and controls the growth of bacteria and scale in the water system.

Table I illustrates the effectiveness of the combination of hydrogen peroxide with a triazole and a polymer of maleic acid, i.e., Belcene 200 in cooling water at temperatures below 212° F.

TABLE I

| | Rate of Corrosion (MPY) |
|---|---|
| EXAMPLE A (Cooling Water) | |
| Polymaleic Acid (Belcene 200) | |
| Benzotriazole | |
| Hydrogen Peroxide | 0.60 |
| EXAMPLE B | |
| Hydrogen Peroxide | 2.50 |

The use of hydrogen peroxide alone, as shown in Example B, resulted in a higher rate of corrosion in comparison to Example A where a combination of the hydrogen peroxide with the triazole and maleic acid polymer was used for treating cooling water.

The following Examples illustrates the scope of the invention:

| Components | Parts by Weight/ Million Parts H₂O |
|---|---|
| EXAMPLE IV | |
| a) Hydrogen peroxide | 0.01–100 |
| b) Anionic Polymers of Unsaturated Carboxylic Acids (Maleic or Acrylic Acid Polymers) | 0.1–200 |
| c) Non-Ionic Surfactants e.g. Alkoxylated Phenols and Alcohols | 0–200 |
| d) Benzotriazole/Tolyltriazole | 0.01–100 |
| EXAMPLE V | |
| a) Hydrogen Peroxide | 0.1–20 |
| b) Anionic Polymers of Maleic Acid | 0.5–75 |
| c) Non-Ionic Surfactants (Ethoxylated Alkyl Phenols or Alcohols) | 0–200 0.1–50 |
| d) Mixtures of Benzotriazoles and Tolyltriazole | 0.1–50 |

In the Examples, the surfactants are non-ionic polymeric phenolic surfactants. Combinations of two or more of these surfactants can be employed. Examples of surfactants that can be used in the present invention are disclosed in U.S. Pat. No. 4,116,853.

The following specific surfactants and/or combinations thereof are preferred in the practice of the invention including:
a) a nonylphenoxy polyethoxy ethanol (sold by Rohm and Haas Co. under the trademark "Triton" N 100), a modified polyethoxy adduct,
b) a non-ionic modified ethoxylated straight chain alcohol (sold by BASF Wyandotte Corp. under the trademark "Plurafac" D-25),
c) a non-ionic ethoxylated abietic acid derivative, and
d) a non-ionic block copolymer of about 90% polyoxypropylene and about 10% polyoxyethylene.

The carboxyl-containing polymers, i.e., polymerized carboxylic acids and derivatives thereof useful for purposes of this invention include the acrylic and methacrylic acids, the esters and amides thereof, and particularly the maleic and fumaric acid homopolymers and copolymers. The preferred polymers derived from maleic acid are available under the trade name BELCLENE-200. These specific maleic acid polymers are excellent calcium carbonate or scale control agents in waters of high alkalinity and hardness. For example, the polymers derived from maleic acid can be used as a sidestream softener with zero blowdown because the polymers have little effect on lime-softener performance. The polymaleic acids contain no phosphates or heavy metals, and therefore are not a problem to dispose of in waste water. For purposes of this invention, polymaleic acid and copolymers thereof can be obtained by homopolymerizing maleic acid or its anhydride by known methods. In the alternative, the polymers can be obtained by copolymerizing maleic acid or its anhydride with other polymerizable monomers, e.g., unsaturated alcohol etc., to form the copolymers.

More specifically, the polymaleic acids can be obtained by neutralizing the monomer, i.e., maleic acid or its anhydride, in an aqueous medium with an alkali metal hydroxide in the presence of a polymerization initiator or catalyst. The comonomers used in preparing the copolymers of the maleic acid or its anhydride include the unsaturated alcohols such as allyl alcohol or allyl ethers. These polymaleic acids and the copolymers derived therefrom have a comparatively narrow molecular weight distribution. These particular polymers have molecular weights ranging up to 20,000, and more likely up to 10,000. This narrow molecular weight distribution of the maleic acid polymers is particularly useful for inhibiting scale in cooling water and as a dispersant for sludge or scale.

The mechanism by which the polymaleic acids function is a combination of threshold-crystal distortion and dispersancy which prevents or delays precipitation of the mineral salts. It is particularly important that the polymers, e.g., polymaleic acids and polyacrylamides not be affected by either chlorine or other oxidizing agents under normal conditions. The anionic polymers derived from maleic acid or acrylic acid are capable of forming insoluble salts with positively charged minerals and are compatible with inhibitors such as tolyltriazole and benzotriazole. The corrosion inhibitors, i.e., the triazoles create a barrier against various other corrosive agents such as hydrogen sulfide, sulfur dioxide and the like by forming a corrosion-resistant film on the surface of the metal such as copper and copper alloys.

In addition to the triazoles, other useful inhibitors include the imidazoles, oxazoles, thiazoles, pyrazoles, and combinations thereof. The triazoles which are preferred for purposes of this invention may be used as mixtures in any relative proportion, and include the water-soluble 1,2,3-triazoles, or substituted 1,2,3-triazoles, and mixtures of 1,2,3-triazoles, such as benzotriazole, tolyltriazole, phenyl 1,2,3-triazole, etc. The pyrazoles include the water-soluble compounds such as trimethyl pyrazole, the benzopyrazoles, and the like. The imidazoles include the water-soluble compounds such as benzimidazole, the phenylimidazoles, methyl-substituted benzimidazole, etc. The oxazoles include the water-soluble compounds such as 2-mercaptoxazole and mercaptobenzoxazole, and thiazoles such as mercaptobenzothiazole, etc. The triazoles, and particularly benzotriazole and tolyltriazole, are added to the water systems to protect copper-containing metals.

The amount of the aromatic triazole ranges from about 0.01 to 100 parts by weight, and preferably 0.1 to 50 parts by weight per million parts by weight of water. In addition, other known inorganic and/or organic inhibitors may be used in small but effective amounts to inhibit corrosion in combination with the benzotriazole and tolyltriazole. These are well known compounds and include the inorganic compounds such as the metal salts such as the nitrates, nitrites, silicates, carbonates, etc.

Schematically, the water, e.g., city water or raw water, is pumped from the cooling tower to a purging station where effective amounts of hydrogen peroxide is added to the water at temperatures below 212° F. at the concentrations indicated herein, and then carried to a sidestream where all or part of the water, e.g., up to 50%, is filtered to remove any sludge or solids. The cooling water is then carried to the heat-exchanger, such as a cooling water table, which is generally used in steel mills, where the water is utilized to reduce the temperature of the table, and therefore the water temperature may increase to temperatures ranging up to 20% of its original temperature. At this point, the dispersing agents, such as polymaleic acid and polyacrylamides and the inhibitor, i.e., triazole inhibitors are added to the stream either prior to the water entering the exchanger or at a point downstream from the exchanger before the water is carried back to the cooling tower. Here, the temperature of the water is decreased and then recycled back to the exchanger with the addition of makeup water as necessary.

While this invention has been described with respect to specific examples, it is obvious that other variations and modifications can be employed with departure from the invention as particularly set forth in the appended claims.

Invention claimed is:

1. A method of preventing and controlling corrosion and build-up of scale in cooling water systems which consists essentially of adding to the cooling water at temperatures below 212° F. an effective amount of hydrogen peroxide to control bacteria, about 0.01 to 100 parts by weight per million parts by weight of water of at least one aromatic triazole, about 0.1 to 200 parts by weight per million parts by weight of water of at least one ethylenically-unsaturated carboxylic acid or derivative thereof polymerized to a water soluble anionic polymer having an average molecular weight ranging from about 250 to 500,000, about 0 to 200 parts by weight of a substantially water soluble polyacrylamide and 0 to 200 parts by weight of a non-ionic surfactant.

2. The method of claim 1 wherein the polymerized ethylenically-unsaturated carboxylic acid is polymerized maleic acid having a molecular weight of 400 to 10,000.

3. The method of claim 1 wherein the hydrogen peroxide is present in amounts ranging from about 0.01 to 100 parts by weight, the polymerized ethylenically-unsaturated carboxylic acid is present in amounts ranging from about 0.5 to 75 parts by weight, the polyacrylamide is present in amounts ranging from about 0.5 to 75 parts by weight and the non-ionic surfactant is a non-ionic ethoxylated alkyl phenol present in an amount of 0.1 to 50 parts by weight.

4. The method of claim 3 wherein the triazole is a mixture of benzotriazole and tolyltriazole.

5. The method of claim 4 wherein the mixture of triazoles is present in an amount ranging from about 0.1 to 50 parts by weight.

6. The method of claim 3 wherein the triazole is tolytriazole and the polymerized-ethylenically unsaturated carboxylic acid is a copolymer of maleic acid and an unsaturated aliphatic alcohol.

7. A method of preventing and controlling corrosion and buildup of scale in cooling water systems which consists essentially of adding to every million parts by weight of the cooling water having temperatures below 212° F.;

(a) about 0.1 to 20 parts by weight of hydrogen peroxide;
(b) about 0.1 to 50 parts by weight of at least one aromatic triazole;
(c) about 0.5 to 75 parts by weight of at least one anionic polymer derived from maleic acid; said polymer having an average molecular weight ranging from about 400 to 10,000;
(d) about 0 to 200 parts by weight of a substantially water soluble polyacrylamide; and
(e) about 0.1 to 50 parts by weight of a nonionic surfactant derived from an ethoxylated phenol.

* * * * *